United States Patent
Masuzaki et al.

(10) Patent No.: US 11,367,020 B2
(45) Date of Patent: Jun. 21, 2022

(54) SIGNAL SELECTION DEVICE, LEARNING DEVICE, AND SIGNAL SELECTION METHOD AND PROGRAM

(71) Applicant: Mitsubishi Electric Corporation, Tokyo (JP)

(72) Inventors: Takahiko Masuzaki, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/423,915

(22) PCT Filed: Mar. 28, 2019

(86) PCT No.: PCT/JP2019/013810
§ 371 (c)(1),
(2) Date: Jul. 19, 2021

(87) PCT Pub. No.: WO2020/194716
PCT Pub. Date: Oct. 1, 2020

(65) Prior Publication Data
US 2022/0044152 A1 Feb. 10, 2022

(51) Int. Cl.
*G06N 20/00* (2019.01)
*G06K 9/00* (2022.01)

(52) U.S. Cl.
CPC ......... *G06N 20/00* (2019.01); *G06K 9/00523* (2013.01)

(58) Field of Classification Search
CPC ................. G06N 20/00; G06K 9/00523
See application file for complete search history.

(56) References Cited

U.S. PATENT DOCUMENTS 6,349,252 B1 2/2002 Imanishi et al.
10,810,512 B1 * 10/2020 Wubbels ............... G06N 20/00
11,120,364 B1 * 9/2021 Gokalp ................. G06N 5/04
(Continued)

FOREIGN PATENT DOCUMENTS

JP 2000-297443 A 10/2000
JP 2001-175972 A 6/2001
(Continued)

OTHER PUBLICATIONS

International Search Report and Written Opinion dated Jun. 25, 2019, received for PCT Application PCT/JP2019/013810, Filed on Mar. 28, 2019, 9 pages including English Translation.
(Continued)

*Primary Examiner* — Soo Shin
(74) *Attorney, Agent, or Firm* — Xsensus LLP

(57) ABSTRACT

A signal selection device (10) selects, from a plurality of candidate signals, a training signal for learning a model (20) usable for data analysis. The signal selection device (10) includes a first acquirer (11) that acquires the plurality of candidate signals and training labels associated with the plurality of candidate signals and being status values corresponding to results of analysis performed using the model, a feature calculator (13) that calculates one or more features for each of the plurality of candidate signals, and a selector (16) that selects the training signal from the plurality of candidate signals based on a degree of relevance between the one or more features and the training labels.

15 Claims, 21 Drawing Sheets

(56) References Cited

U.S. PATENT DOCUMENTS

| | | | |
|---|---|---|---|
| 11,215,980 B2* | 1/2022 | Celia | G05B 13/028 |
| 2007/0250522 A1* | 10/2007 | Perrizo | G06N 20/00 |
| 2016/0142493 A1 | 5/2016 | Moriguchi et al. | |
| 2019/0041235 A1 | 2/2019 | Ko et al. | |
| 2019/0087186 A1 | 3/2019 | Endo | |
| 2019/0122119 A1* | 4/2019 | Husain | G06N 3/084 |
| 2019/0236555 A1* | 8/2019 | Bennett | G06F 3/0482 |
| 2020/0167659 A1* | 5/2020 | Moon | G06N 5/043 |
| 2021/0407638 A1* | 12/2021 | Neumann | G06F 21/31 |

FOREIGN PATENT DOCUMENTS

| | | |
|---|---|---|
| JP | 2010-282547 A | 12/2010 |
| JP | 2012-220978 A | 11/2012 |
| JP | 2015-28742 A | 2/2015 |
| JP | 2016-152039 A | 8/2016 |
| JP | 2017-174045 A | 9/2017 |
| JP | 2018-5640 A | 1/2018 |
| JP | 2019-32185 A | 2/2019 |

OTHER PUBLICATIONS

Decision to Grant dated Jun. 2, 2020, received for JP Application 2020-519458, 5 pages including English Translation.

* cited by examiner

FIG.10

| \_42 | | | | | |
|---|---|---|---|---|---|
| STORAGE DATA ||||||
| FIRST CANDIDATE SIGNAL || ... | THIRD CANDIDATE SIGNAL || TRAINING LABEL |
| VALUE | FEATURE | ... | VALUE | FEATURE | |
| 111 | 120 | ... | 234 | 239 | L1 |
| ⋮ | | ... | ⋮ | | |
| 123 | | ... | 256 | | |
| 100 | 110 | ... | 255 | 280 | L1 |
| ⋮ | | ... | ⋮ | | |
| 119 | | ... | 290 | | |
| 135 | 150 | ... | 321 | 322 | L2 |
| ⋮ | | ... | ⋮ | | |
| 157 | | ... | 323 | | |
| ⋮ | ⋮ | ⋮ | ⋮ | ⋮ | ⋮ |

FIG.12

| LABEL ASSIGNED BY MODEL M12 | LABEL ASSIGNED BY MODEL M13 | LABEL ASSIGNED BY MODEL M23 | TRAINING LABEL |
|---|---|---|---|
| L1 | L1 | L2 | L1 |
| L1 | L2 | L1 | L1 |
| L2 | L2 | L2 | L2 |
| ⋮ | ⋮ | ⋮ | ⋮ |

| MATCH RATE WITH TRAINING LABEL | 80% | 20% | 50% |
|---|---|---|---|

FIG.13

| CANDIDATE SIGNAL | CANDIDATE SIGNAL SELECTION RESULT | DEGREE OF CONTRIBUTION |
|---|---|---|
| FIRST CANDIDATE SIGNAL | SELECT (FIRST TRAINING SIGNAL) | 50 |
| SECOND CANDIDATE SIGNAL | SELECT (SECOND TRAINING SIGNAL) | 65 |
| ⋮ | ⋮ | ⋮ |
| ⋮ | SELECT (THIRD TRAINING SIGNAL) | 35 |
| ⋮ | ⋮ | ⋮ |
| THIRD CANDIDATE SIGNAL | EXCLUDE | 0 |

FIG.16

| ACQUIRED DATA | | | TRAINING LABEL |
|---|---|---|---|
| FIRST CANDIDATE SIGNAL VALUE | SECOND CANDIDATE SIGNAL VALUE | ... | |
| 111 | 234 | ... | L1 |
| ⋮ | ⋮ | ... | |
| 123 | 256 | ... | |
| 100 | 255 | ... | L1 |
| ⋮ | ⋮ | ... | |
| 119 | 290 | ... | |
| 135 | 321 | ... | L2 |
| ⋮ | ⋮ | ... | |
| 157 | 323 | ... | |
| ⋮ | ⋮ | ⋮ | ⋮ |

FIG.17

| ACQUIRED DATA | | | |
|---|---|---|---|
| FIRST CANDIDATE SIGNAL | SECOND CANDIDATE SIGNAL | ... | TRAINING LABEL |
| VALUE | VALUE | ... | |
| 111 | 234 | ... | L1 |
| ⋮ | ⋮ | ... | |
| 123 | 256 | ... | |
| 100 | 255 | ... | L1 |
| ⋮ | ⋮ | ... | |
| 119 | 290 | ... | |
| 135 | 321 | ... | L2 |
| ⋮ | ⋮ | ... | |
| 157 | 323 | ... | |
| ⋮ | ⋮ | ⋮ | ⋮ |
| 124 | 256 | ... | L2 |
| ⋮ | ⋮ | ... | |
| 147 | 288 | ... | |
| ⋮ | ⋮ | ⋮ | ⋮ |

ADDITIONAL SIGNAL (last three data rows)

US 11,367,020 B2

SIGNAL SELECTION DEVICE, LEARNING DEVICE, AND SIGNAL SELECTION METHOD AND PROGRAM

CROSS-REFERENCE TO RELATED APPLICATION

The present application is based on PCT filing PCT/JP2019/013810, filed Mar. 28, 2019, the entire contents of which are incorporated herein by reference.

TECHNICAL FIELD

The present disclosure relates to a signal selection device, a learning device, a signal selection method, and a program.

BACKGROUND ART

At production sites and plants, various signals are used in analysis for purposes such as preventive maintenance. Selectively using signals effective in analysis from these various signals can shorten the analysis time. However, selecting effective signals from numerous signals is usually difficult and often relies on experiences and know-how of skilled persons. Thus, techniques for selecting one or more datasets from multiple datasets as appropriate can be applied to selecting signals (see, for example, Patent Literature 1).

Patent Literature 1 describes a plant control system in which intended data selected from data acquired by a monitoring controller is transmitted to an engineering workstation connected to the monitoring controller. The monitoring controller selects data for transmission based on the type or value of the acquired data.

CITATION LIST

Patent Literature

Patent Literature 1: Unexamined Japanese Patent Application Publication No. 2015-28742

SUMMARY OF INVENTION

Technical Problem

However, the technique described in Patent Literature 1 includes setting the type of data to be selected and setting the value of the data as a condition for data selection in accordance with the use of the selected data. Appropriately setting those also involves technical expertise, as well as complicated operations based on technical expertise. Any inappropriate settings can then disable appropriate data selection.

Various datasets including signals are typically analyzed using a predefined model. Such a model includes, for example, a classifier for determining whether data is abnormal and a regression equation for regression analysis. The model can be generated using existing data. However, selecting appropriate data to be used for generating the model from many datasets is often difficult. When appropriate data is not selected, any inappropriate selection of data can decrease the accuracy of the model.

In response to the above issue, an objective of the present disclosure is to improve the accuracy of a model to be used for data analysis.

Solution to Problem

To achieve the above objective, a signal selection device according to an aspect of the present disclosure is a device for selecting, from a plurality of candidate signals, a training signal for learning a model usable for data analysis. The device includes first acquisition means for acquiring the plurality of candidate signals and training labels associated with the plurality of candidate signals and being status values corresponding to results of analysis performed using the model, feature calculation means for calculating one or more features using the plurality of candidate signals, and selection means for selecting the training signal from the plurality of candidate signals based on a degree of relevance between the one or more features and the training labels.

Advantageous Effects of Invention

The selection means according to the above aspect of the present disclosure selects a training signal from multiple candidate signals based on the degree of relevance between the features and the training labels. This improves the accuracy of a model to be used for data analysis.

BRIEF DESCRIPTION OF DRAWINGS

FIG. 10 is a table showing example storage data in Embodiment 1;

FIG. 12 is a table showing match rates between labels in Embodiment 1;

FIG. 13 is a table showing the degree of contribution in Embodiment 1;

FIG. 16 is a table showing example data acquired by a first acquirer in Embodiment 1;

FIG. 17 is a table showing example additional signals acquired by a second acquirer in Embodiment 1;

DESCRIPTION OF EMBODIMENTS

A learning device 100 according to one or more embodiments of the present disclosure will now be described in detail with reference to the drawings.

Embodiment 1

Figure 1:
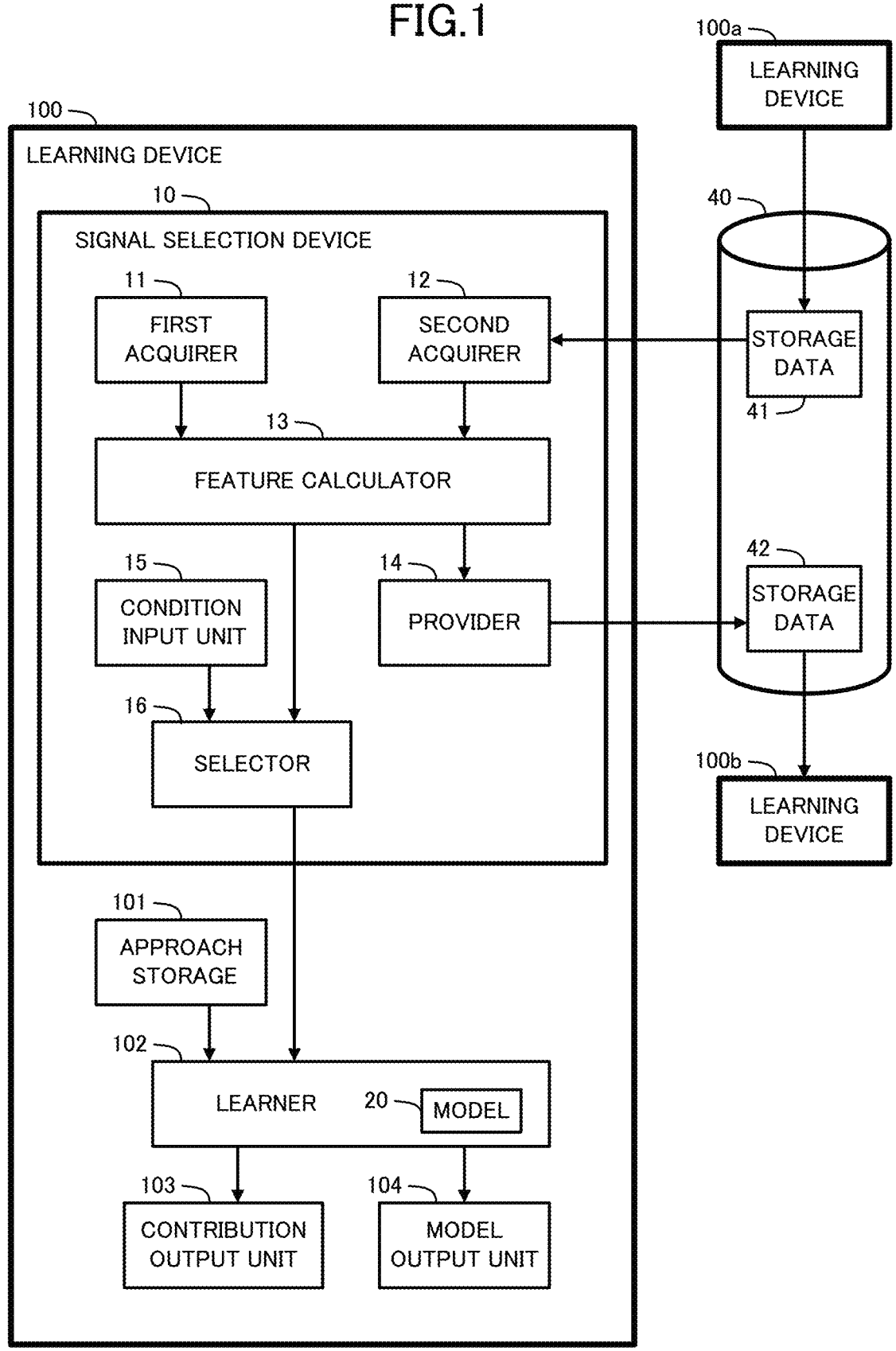
FIG. 1 is a functional block diagram of a learning device according to Embodiment 1 of the present disclosure.

FIG. 1 is a block diagram of the learning device 100 according to the present embodiment. The learning device 100 is a computer, typically an industrial personal computer (IPC), that learns a model for analysis using input signals. The model is used for various data analyses. For example, the model is used to classify input signals and assign one of multiple labels to each input signal in accordance with the classification. The model may be used to assign labels indicating continuous values, as in regression analysis. The learning device 100 is typically installed at a factory using a trained model.

The model receives an input signal selected as an effective signal for analysis from various signals usable at the factory. The input signal may be, for example, time-series data representing measurement values acquired by a sensor included in a production system installed at the factory. The input signal includes a digital signal indicating a digital value of 8 bits, 32 bits, or 1024 bits per sampling cycle of 1 microsecond, 1 millisecond, or 1 second. However, the input signal may be in any format other than the above. A single or multiple input signals may be input. The input signal may have a sampling value not limited to a scalar value. The sampling value may be a vector value including multiple values.

Assigning a label refers to determining a label for an input signal. A label is a status value to be assigned from data analysis. A label may for example be normal or abnormal, or a combination of three or more statuses such as normal, slower response, memory access error, and hardware failure. A label may also be a continuous value. The learning device 100 learns a model to monitor a production system for any abnormality based on measurement values acquired by a sensor in real time. However, the model may be used in any manner to improve the efficiency of the production system. For example, the model may be learned for preventive maintenance, predictive detection, degradation diagnosis, or lifetime prediction. In the example described below, a model for determining the presence of any abnormality is learned.

Figure 2:
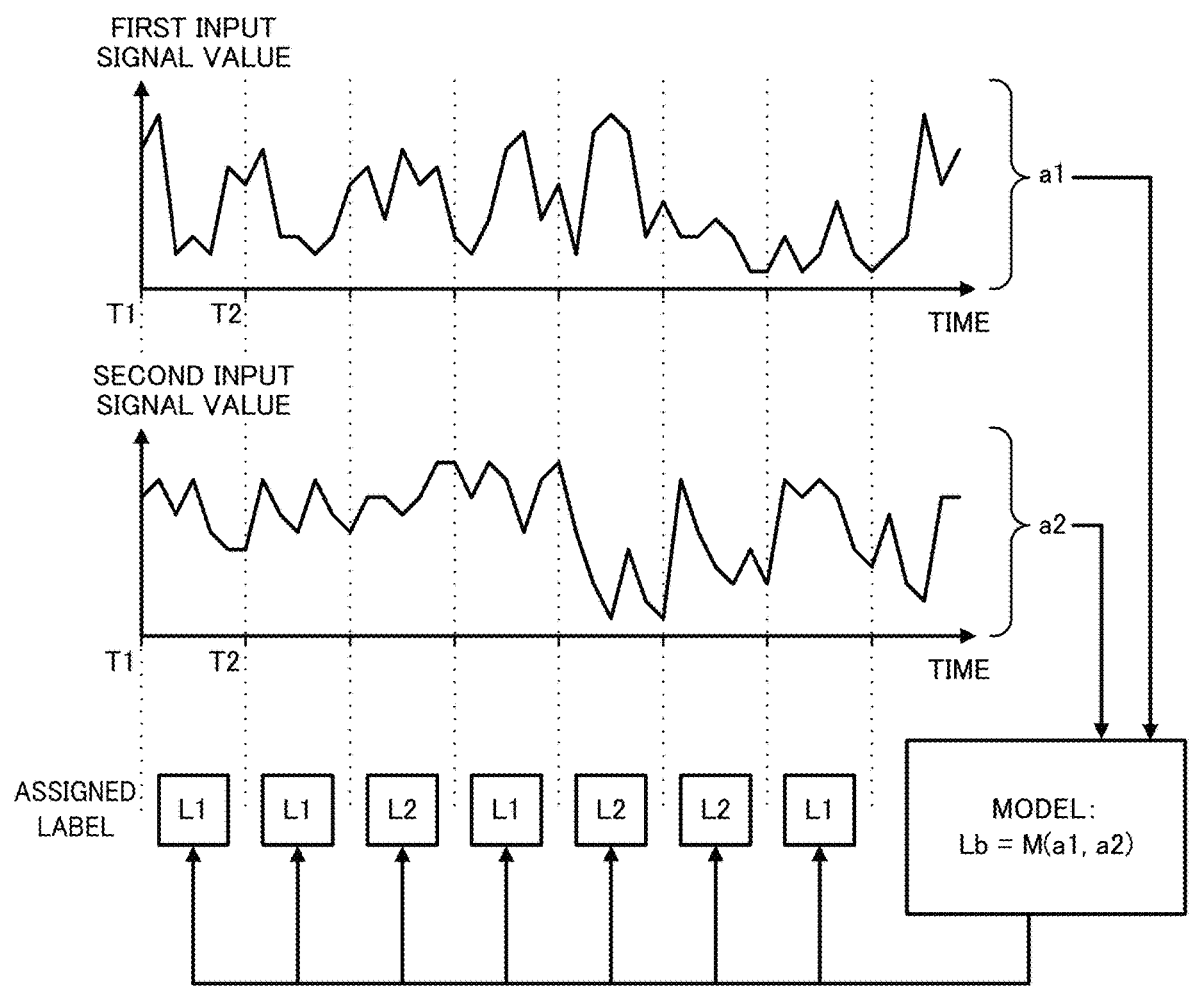
FIG. 2 is a diagram describing an example model in Embodiment 1.

A model learned by the learning device 100 will now be described with reference to FIG. 2. FIG. 2 shows example input signals including a first input signal and a second input signal. A value a1 of the first input signal and a value a2 of the second input signal are input into a model M, which then determines a label Lb. The model M can be represented as a function M(a1, a2) of the value a1 and the value a2. The label Lb determined in accordance with the model is either a label L1 or a label L2.

In detail, a partial signal extracted from each input signal for a time interval from T1 to T2 is input into the model M to assign a label to the interval. The adjacent intervals are also assigned with labels successively in accordance with the model M. The intervals are predetermined periods corresponding to labels. The intervals may be periodic intervals of, for example, 10 milliseconds or 10 seconds, or may be nonperiodic.

Figure 3:
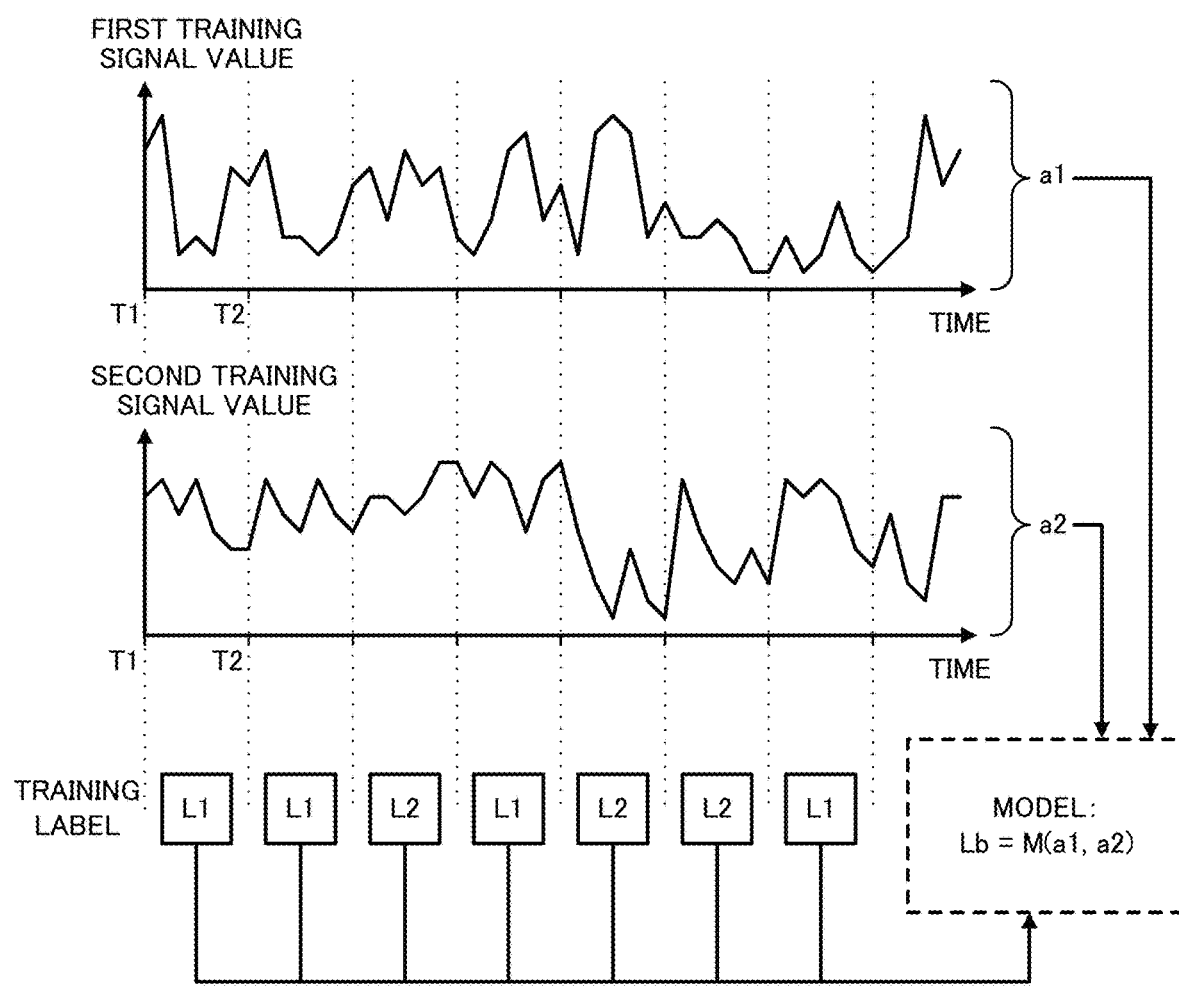
FIG. 3 is a diagram describing model learning in Embodiment 1.

As shown in FIG. 2, the labels determined using multiple input signals with the model may allow monitoring of various abnormalities. Such a model differs from one production system to another and is to be learned for each production system. As shown in FIG. 3, a model is learned using training signals fed as input signals for model learning and training labels to be assigned to the training signals. The training signals correspond to sample input signals and are, for example, output from the same sensors as or sensors similar to the sensors that output the input signals. The training signals may be samples processed for model learning. For example, although an abnormality corresponding to the label L2 is rare in reality, the training signals are preferably sample processed so as to include more signals representing an abnormality for model learning. Model learning is achieved with an approach used in the field of machine learning, pattern recognition, or statistical analysis. The training labels are preassigned to the training signals for model learning by, for example, a user. More specifically, the training labels are status values corresponding to the results of analysis performed using the model.

Typically, an enormous number of signals are acquired in a production system, including signals unintended for assigning labels. Thus, training signals for model learning are selected from many candidate training signals.

Figure 4:
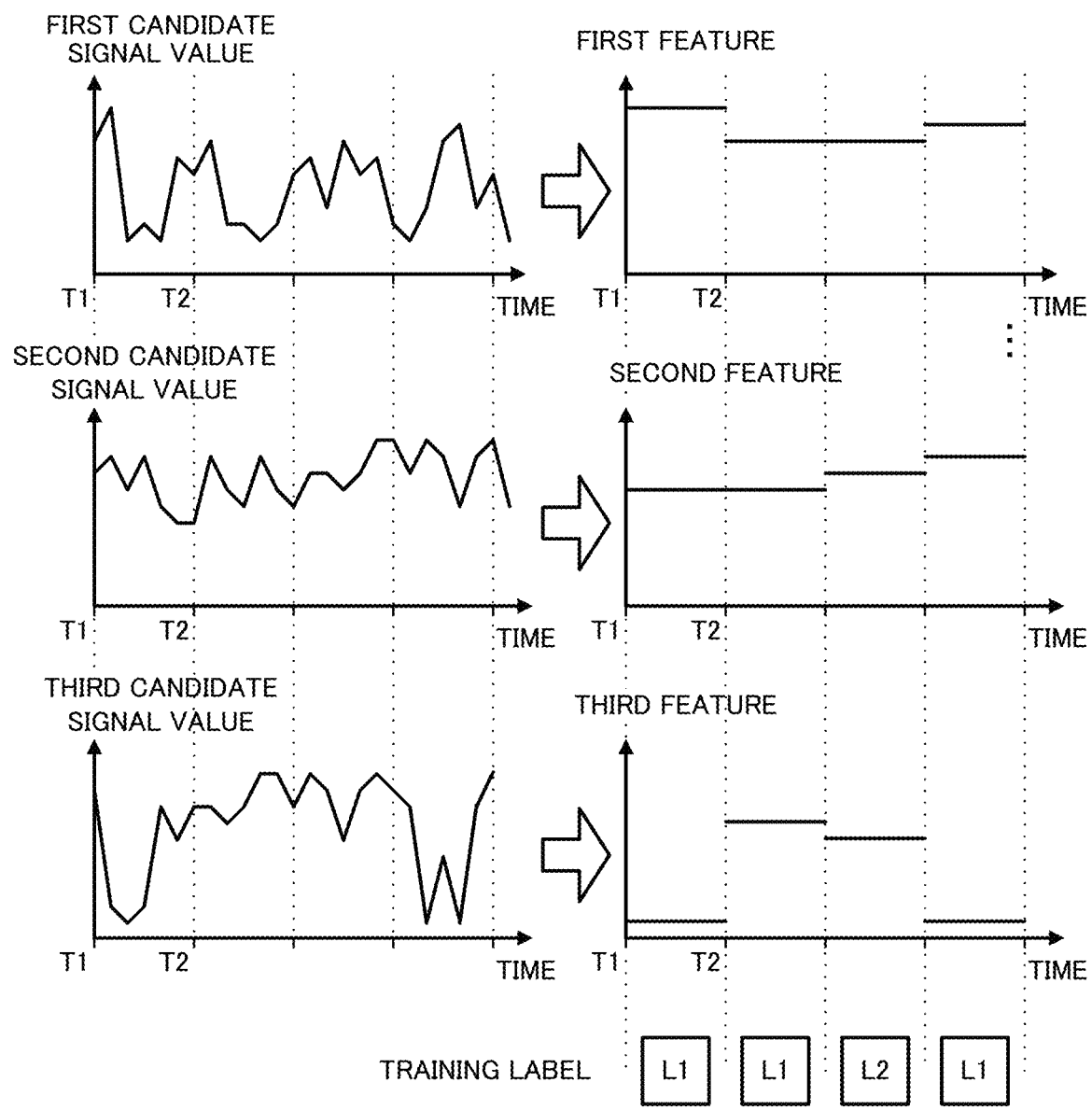
FIG. 4 is a diagram describing a first calculation of features in Embodiment 1.

FIG. 4 shows example candidate signals including a first candidate signal, a second candidate signal, and a third candidate signal. To select a training signal from the candidate signals, the learning device 100 calculates one or more features from the candidate signals. In detail, the learning device 100 calculates a feature of each candidate signal for an interval having each training label. The feature is, for example, but not limited to, a statistical value of each partial signal extracted for a corresponding interval from a candidate signal. A candidate signal having the highest degree of relevance between the feature and the training label assigned to the interval with the feature calculated is selected as a training signal.

Figure 5:
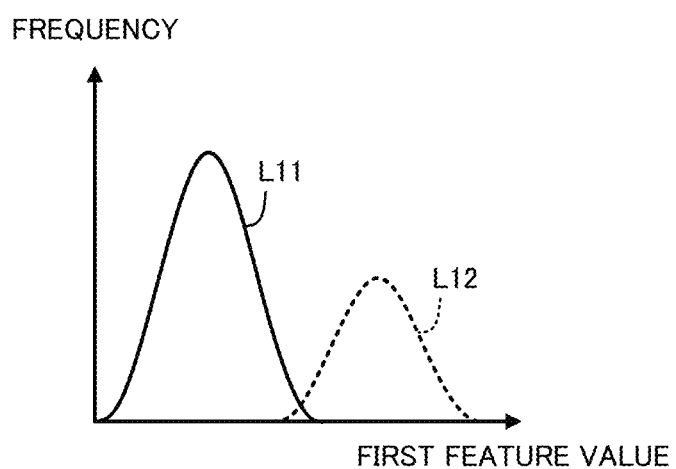
FIG. 5 is a graph showing a first relationship between a feature and training labels in Embodiment 1.

In the example shown in FIG. 5, a first feature calculated using the first candidate signal is represented as a frequency distribution for each training label. In FIG. 5, the line L11 represents the frequency distribution of the first feature calculated for each interval with the training label L1, and the line L12 is the frequency distribution of the second feature calculated for each interval with the training label L2. In the example in FIG. 5, the first feature with greater values corresponds to the training label L2, and the first feature with smaller values corresponds to the training label L1. The first feature is correlated with the training labels and is thus highly relevant to the training labels. The first candidate signal corresponding to the first feature is selected as a training signal.

Figure 6:
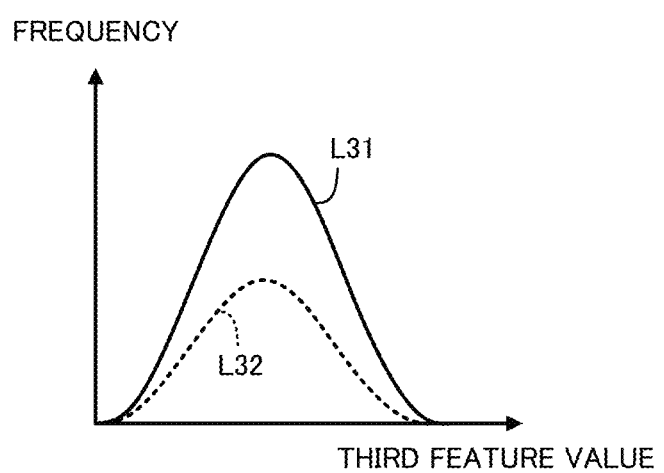
FIG. 6 is a graph showing a second relationship between a feature and training labels in Embodiment 1.

In FIG. 6, a third feature calculated using the third candidate signal is represented as a frequency distribution, in the same manner as in FIG. 5. The line L31 in FIG. 6 represents the frequency distribution of the third feature calculated for each interval with the training label L1, and the line L32 is the frequency distribution of the third feature calculated for each interval with the training label L2. In the example in FIG. 6, the values of the third feature are uncorrelated with the training labels. The third feature thus has a low degree of relevance to the training labels. The third candidate signal corresponding to the third feature is normally not selected as a training signal.

Figure 7:
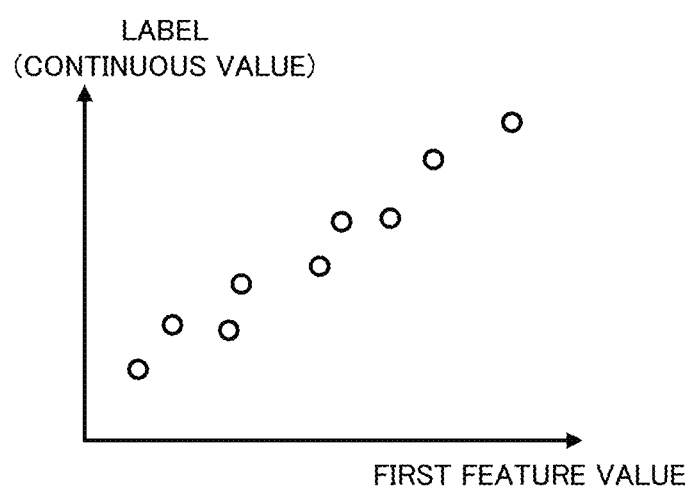
FIG. 7 is a graph showing a third relationship between a feature and training labels in Embodiment 1.
Figure 8:
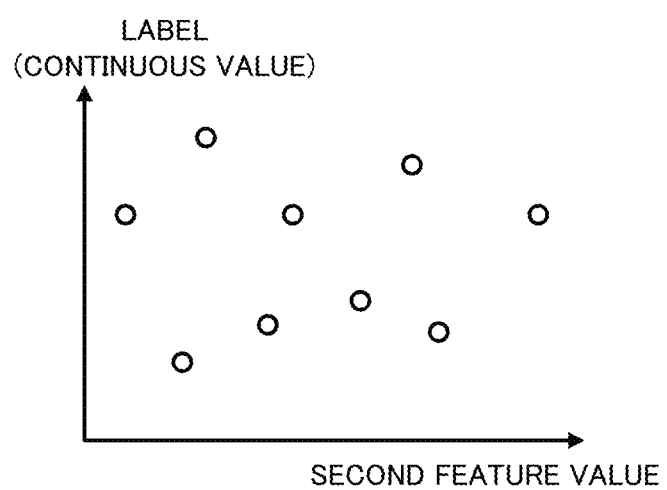
FIG. 8 is a graph showing a fourth relationship between a feature and training labels in Embodiment 1.

In the example frequency distributions shown in FIGS. 5 and 6, data is classified and assigned with labels having discrete values. However, data may be processed in a different manner. For regression analysis, the first feature has a high degree of relevance to the labels as shown in FIG. 7, and the second feature has a low degree of relevance to the labels as shown in FIG. 8. In this case, the first candidate signal corresponding to the first feature is selected as a training signal. More specifically, the correlation coefficient between the feature and the labels may be used to quantify the degree of relevance between the labels and the feature.

Referring back to FIG. 1, the learning device 100 includes, as functional components, a signal selection device 10 that selects a training signal from multiple candidate signals, an approach storage 101 that stores data representing approaches for learning a model 20, a learner 102 that learns the model 20 based on the training signal selected by the signal selection device 10, a contribution output unit 103 that outputs a degree of contribution of a training signal to the model 20, and a model output unit 104 that outputs a learned model.

The signal selection device 10 includes a first acquirer 11 that acquires multiple candidate signals and training labels preassigned to the candidate signals, a second acquirer 12 that acquires additional signals to be added to the multiple candidate signals and training labels assigned to the additional signals, a feature calculator 13 that calculates features using the candidate signals, a provider 14 that provides the calculated features and the training labels to an external device, a condition input unit 15 that receives a condition set for selecting a training signal, and a selector 16 that selects a training signal based on a comparison between the features and the training labels.

The first acquirer 11 acquires data representing multiple candidate signals and training labels provided by the user in a manner associated with each other. Acquiring the data includes receiving data input by the user, reading data from a recording medium provided by the user, or reading data from a storage at an address specified by the user. The first acquirer 11 outputs the acquired data to the feature calculator 13. The first acquirer 11 is an example of first acquisition means for acquiring, in the signal selection device 10, the plurality of candidate signals and training labels associated with the plurality of candidate signals.

The second acquirer 12 acquires, from a server 40, storage data 41 including additional signals and training labels provided from a learning device 100a different from the learning device 100. The learning device 100a is installed at the same factory as or at a different factory from the learning device 100 and has substantially the same structure as the learning device 100. The server 40 is a database server connected to the learning devices 100 and 100a with a network. The storage data 41 acquired by the second acquirer 12 may include features (described later). When the data acquired by the first acquirer 11 is insufficient or when the accuracy of signal selection and model learning using data acquired by the first acquirer is to be improved, the storage data 41 acquired by the second acquirer 12 is used. The additional signals indicate sensing results as time-series data. The additional signals are added to the candidate signals for the sensor of the same type as the sensor outputting the time-series data. The second acquirer 12 outputs the acquired storage data 41 to the feature calculator 13. The second acquirer 12 is an example of second acquisition means for acquiring, in the signal selection device 10, a plurality of additional signals and one or more features associated with the plurality of additional signals.

The feature calculator 13 calculates one or more features using the multiple candidate signals acquired by the first acquirer 11. The feature is, for example, but not limited to, a statistical value, typically an autocorrelation, a mean, and a variance, or a maximum or minimum value of a partial signal extracted from a candidate signal. In some embodiments, the feature may be another value. When the storage data 41 acquired by the second acquirer 12 includes no feature, the feature calculator 13 calculates features using the candidate signals included in the storage data 41. The feature calculator 13 outputs the acquired candidate signals and training labels and the calculated features to the provider 14 and the selector 16. The feature calculator 13 is an example of feature calculation means for calculating one or more features using the plurality of candidate signals.

Figure 9:
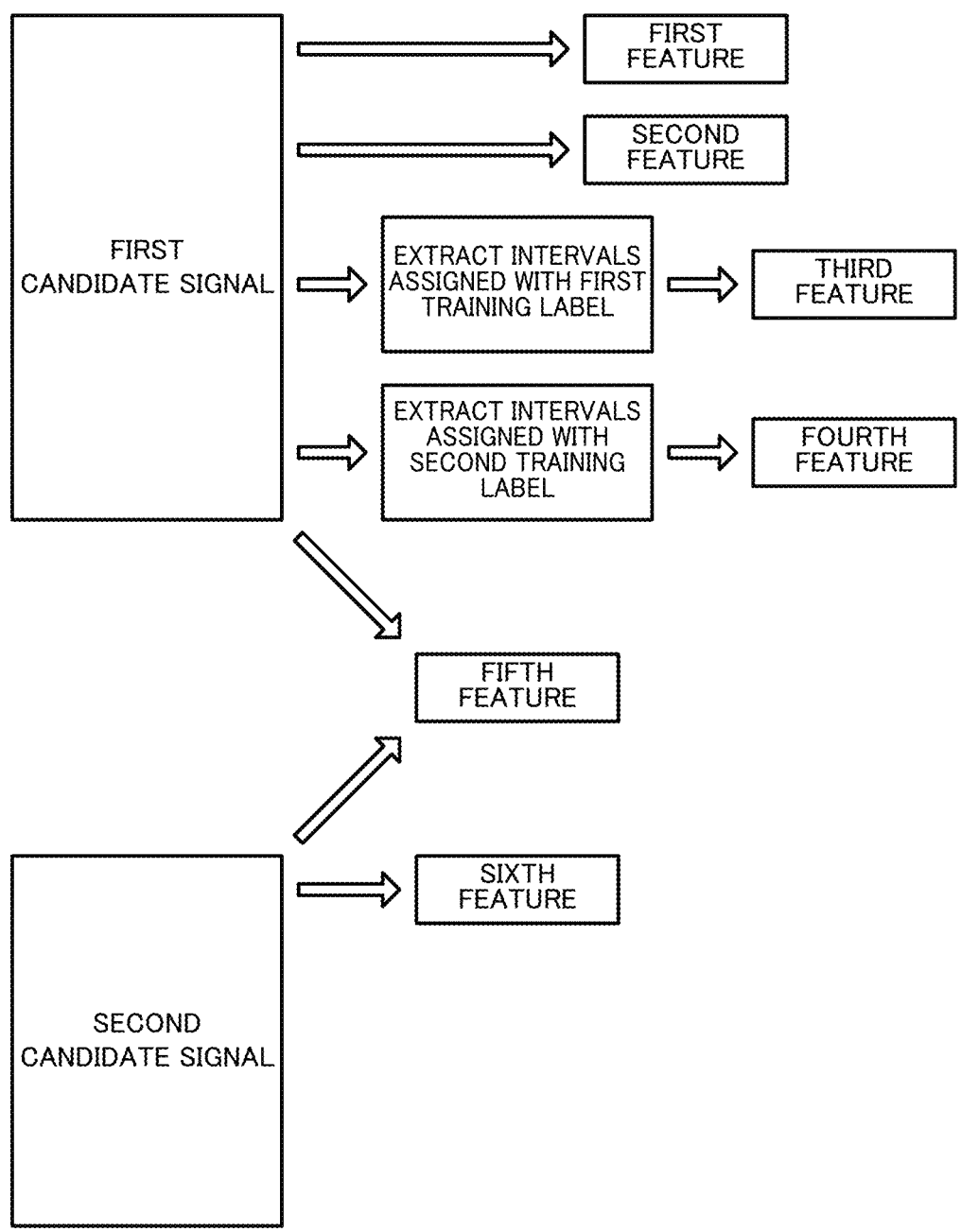
FIG. 9 is a diagram describing a second calculation of features in Embodiment 1.

In the example shown in FIG. 4, one feature is calculated using each candidate signal. Any other number of features may be calculated using each candidate signal. As shown in FIG. 9, the feature calculator 13 may calculate a first feature and a second feature using a first candidate signal. The feature calculator 13 may extract intervals assigned with a first training label from the first candidate signal to calculate a third feature and extract intervals assigned with a second training label to calculate a fourth feature different from the third feature. The feature calculator 13 may calculate, using multiple candidate signals, fewer features than the candidate signals. For example, as shown in FIG. 9, the feature calculator 13 may calculate a fifth feature using the first candidate signal and the second candidate signal. For example, the fifth feature is a statistical value, typically a correlation coefficient or a mean.

Referring back to FIG. 1, the provider 14 associates the candidate signals, the training labels, and the features acquired from the feature calculator 13 with one another, and provides the resultant data as storage data 42 to the server 40. The storage data 42 is used by a learning device 100b for signal selection and model learning. FIG. 10 shows an example of the storage data 42. The provider 14 is an example of providing means for providing, to another device, the plurality of candidate signals and one or more features in a manner associated with each other.

The condition input unit 15 receives input of at least one of a condition about model learning or a condition about selection of a training signal. The condition may be, for example, a purpose or the use of the model, typically predictive detection, designation of a signal analysis approach including a model learning approach, the accuracy of analysis intended by the user, the number of training signals to be selected, or the processing time allowed by the user. The condition input into the condition input unit 15 is transmitted to the selector 16.

The selector 16 selects a training signal appropriate for model learning from multiple candidate signals based on the condition transmitted from the condition input unit 15 and the data output from the feature calculator 13. In detail, the selector 16 selects a signal based on a condition-dependent relationship between features and training labels. For example, when the set condition is abnormality detection, the selector 16 selects a candidate signal corresponding to a feature that correlates with the training labels as the training signal. The selector 16 uses a different approach to select the training signal depending on the condition. For example, when the set condition is degradation diagnosis or lifetime prediction, the selector 16 selects, as the training signal, a candidate signal corresponding to a feature with the relationship with the training labels varying over time.

When the input condition is an analysis approach, the selector 16 may select a signal for generating a feature to be used with the input analysis approach. For an analysis approach designated based on an electric current value for example, the selector 16 may select a signal indicating an electric current value. When the input condition is relatively high accuracy, the selector 16 may increase the number of signals to be selected to increase the accuracy of the model. When the input condition is a relatively short allowable processing time, the selector 16 may reduce the number of signals to be selected.

The selector 16 may select a signal after calculating the degree of usefulness of each feature in label assignment. For example, the degree of usefulness is higher for the first feature illustrated in FIG. 5 with clearly separate classes, and is lower for the third feature illustrated in FIG. 6 with unclearly separate classes. The selector 16 may have a predetermined threshold for determining the distance between the distributions corresponding to the classes for a signal to be a selection target, and may select a signal based on whether the distance between the distributions is greater than the threshold. The selector 16 is an example of selection means for selecting the training signal from the plurality of candidate signals based on a degree of relevance between the features and the training labels.

Referring back to FIG. 1, the learner 102 reads data representing a learning approach from the approach storage 101 and learns a model using the read approach in accordance with the condition input into the condition input unit 15. The learner 102 is an example of learning means for learning the model based on the training signal selected by the signal selection device 10. The approach storage 101 stores various items of information for model learning. The information may include, for example, a procedure or an algorithm for model learning and a program executable for model learning.

The contribution output unit 103 calculates and outputs the degree of contribution of a training signal to label assignment. In detail, the contribution output unit 103 extracts one or more signals from multiple training signals and trains the learner 102 to learn a new model using the extracted signals and a learned model. For an extracted signal with a higher degree of contribution, the labels assigned to the extracted signal by the new model have a higher match rate with the training labels. For an extracted signal with a lower degree of contribution, the labels assigned to the extracted signal by the new model have a lower match rate with the training labels.

Figure 11:
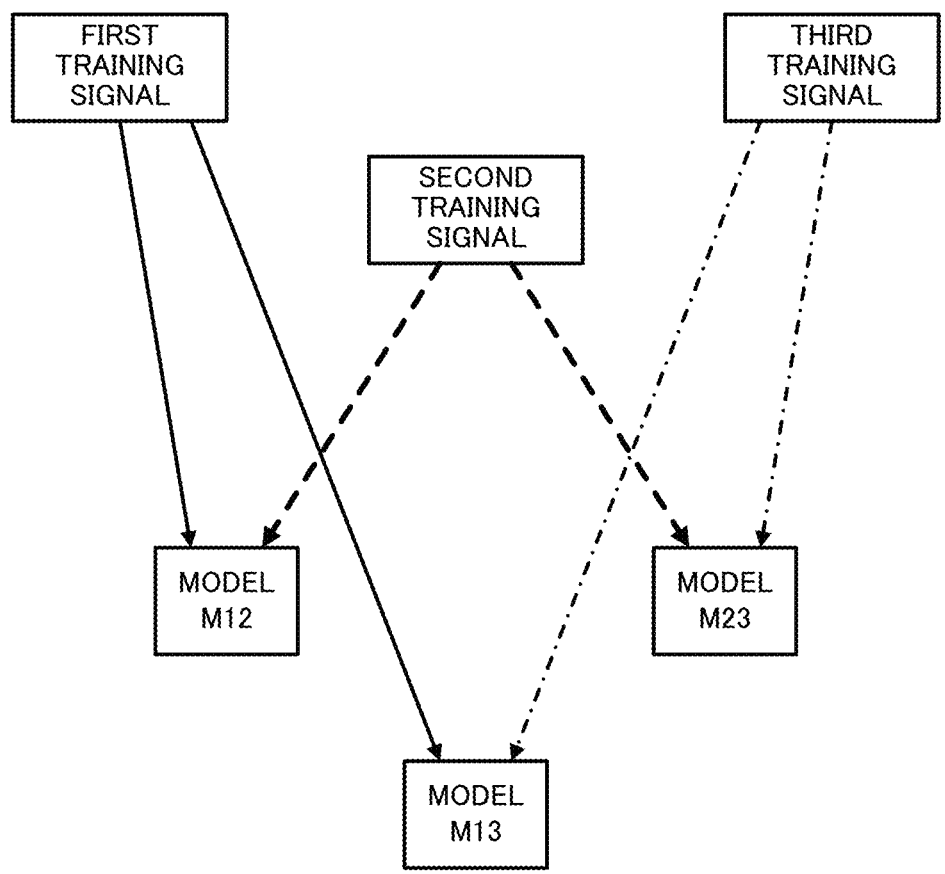
FIG. 11 is a diagram describing generation of new models in Embodiment 1.

Among three signals, namely, a first training signal, a second training signal, and a third training signal, as shown in FIG. 11 for example, a new model M12 is learned using the first and second training signals without using the third training signal. Similarly, a new model M13 is learned using the first and third training signals without using the second training signal, and a new model M23 is learned using the second and third training signals without using the first training signal.

As shown in FIG. 12, labels assigned by the new models M12, M13, and M23 are compared with the training labels to yield the match rate between the labels assigned by each new model and the training labels. In the example in FIG. 10, the labels assigned by the model M12 have a relatively high match rate of 80% with the training labels. The label assignment has a certain degree of accuracy without the third training signal. This reveals that the first and second training signals have a higher degree of contribution than the third training signal. Similarly, the labels assigned by the model M13 have a relatively low match rate with the training labels. This reveals that the second training signal has a higher degree of contribution.

As shown in FIG. 13, the contribution output unit 103 calculates and outputs the degree of contribution of each training signal based on the match rate between the labels. The degree of contribution is calculated using the match rate in any manner. For example, the contribution output unit 103 may use, as the degree of contribution, the mean of the match rates generated by new models learned using a single training signal. In the example shown in FIG. 13, the contribution output unit 103 may use, as the contribution rate of the first training signal, the mean of 50% of the match rates generated by the new models M12 and M13 learned using the first training signal. Similarly, the contribution output unit 103 may use, as the contribution rate of the second training signal, the mean of 65% of the match rates generated by the models M12 and M23, and may use, as the contribution rate of the third training signal, the mean of 35% of the match rates generated by the models M13 and M23. The degree of contribution may be output to a display for a user, or may be written into a storage or transmitted to another device. The contribution output unit 103 is an example of contribution output means for outputting a degree of contribution indicating the degree of contribution of a plurality of the training signals selected by the signal selection device 10 to label assignment.

The model output unit 104 outputs data representing the model learned by the learner 102 by writing the data into a storage or transmitting the data to another device. The model output by the model output unit 104 is used to label input signals.

Figure 14:
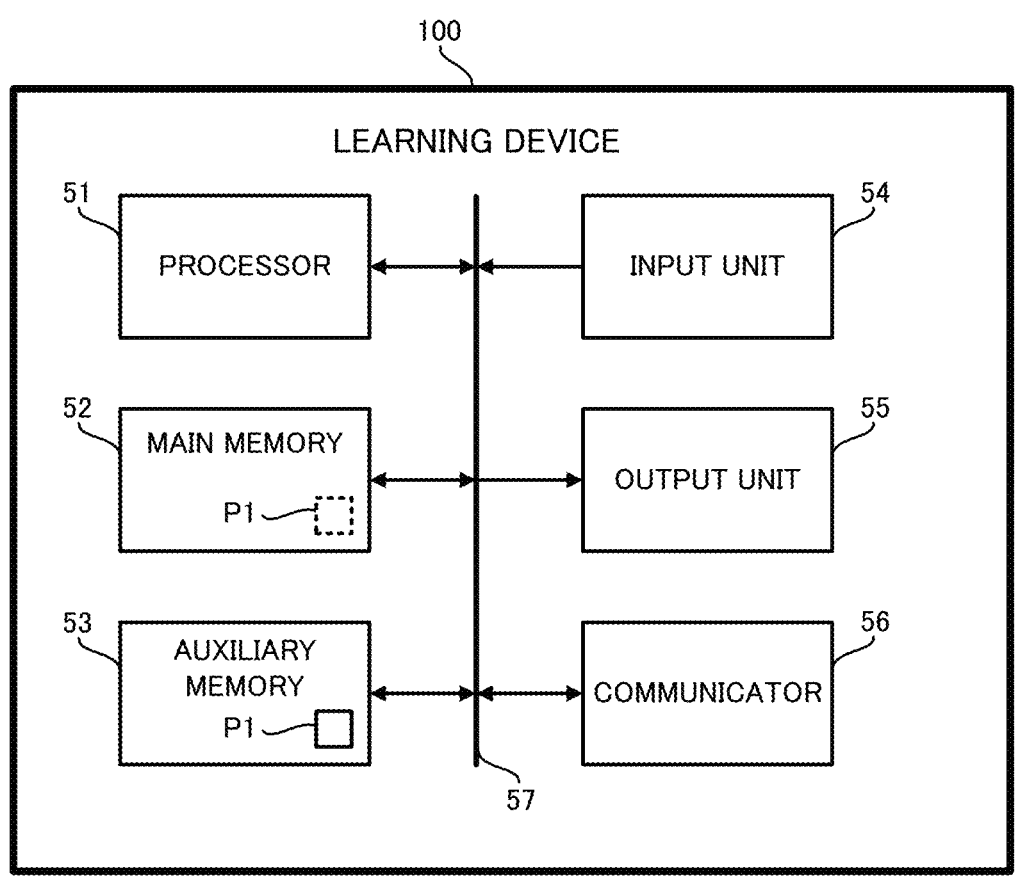
FIG. 14 is a hardware diagram of the learning device according to Embodiment 1.

As shown in FIG. 14, the learning device 100 includes, as hardware components, a processor 51, a main memory 52, an auxiliary memory 53, an input unit 54, an output unit 55, and a communicator 56 to implement the functions described above. The main memory 52, the auxiliary memory 53, the input unit 54, the output unit 55, and the communicator 56 are all connected to the processor 51 with an internal bus 57.

The processor 51 includes a central processing unit (CPU). The processor 51 executes a program P1 stored in the auxiliary memory 53 to implement the various functions of the learning device 100 and perform the processing described later.

The main memory 52 includes a random-access memory (RAM). The main memory 52 stores the program P1 loaded from the auxiliary memory 53. The main memory 52 is used as a work area by the processor 51.

The auxiliary memory 53 includes a non-volatile memory, typically an electrically erasable programmable read-only memory (EEPROM) or a hard disk drive (HDD). The auxiliary memory 53 stores, in addition to the program P1, various data items used in the processing performed by the processor 51. The auxiliary memory 53 provides data usable by the processor 51 to the processor 51 and stores data provided by the processor 51 in accordance with instruction by the processor 51.

The input unit 54 includes input devices, typically input keys and a pointing device. The input unit 54 acquires information input by the user of the learning device 100 and provides the acquired information to the processor 51.

The output unit 55 includes output devices, typically a liquid crystal display (LCD) and a speaker. The output unit 55 presents various items of information to the user as instructed by the processor 51.

The communicator 56 includes a network interface circuit for communicating with external devices. The communicator 56 receives external signals and outputs data represented by the signals to the processor 51. The communicator 56 also transmits signals representing data output from the processor 51 to external devices.

The hardware components shown in FIG. 14 cooperate together to enable the learning device 100 to implement the various functional components shown in FIG. 1. In detail, at least one of the processor 51, the input unit 54, and the communicator 56 implements the first acquirer 11. The communicator 56 implements the second acquirer 12 and the provider 14. The processor 51 implements the feature calculator 13, the selector 16, and the learner 102. The input unit 54 implements the condition input unit 15. The auxiliary memory 53 implements the approach storage 101. At least one of the processor 51, the output unit 55, and the communicator 56 implements the contribution output unit 103 and the model output unit 104.

Figure 15:
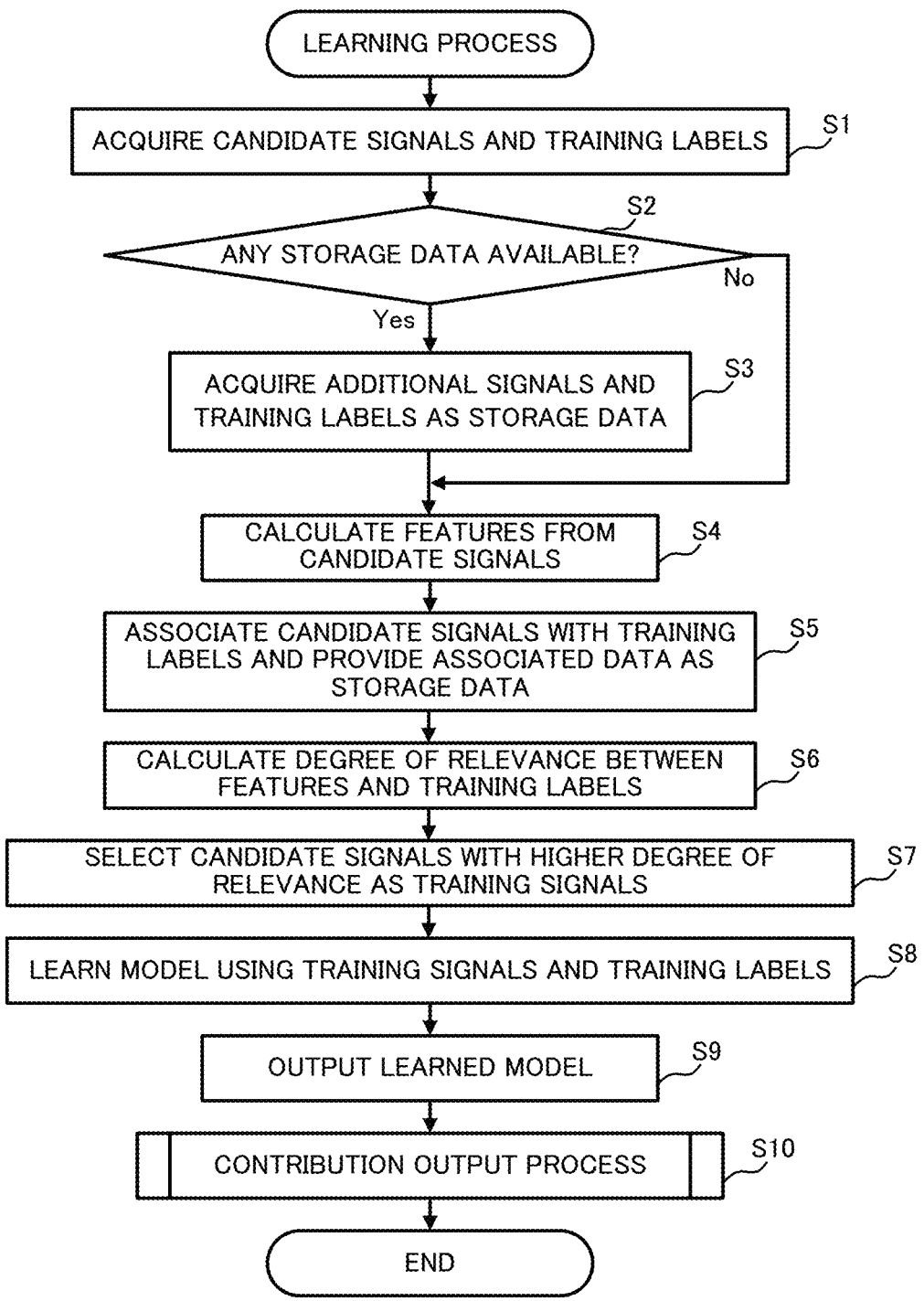
FIG. 15 is a flowchart showing a learning process in Embodiment 1.
Figure 18:
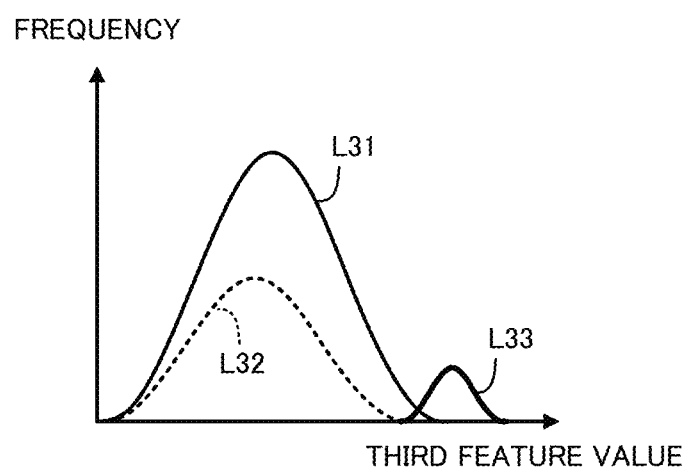
FIG. 18 is a graph showing the relationship between a feature and labels in Embodiment 1.
Figure 19:
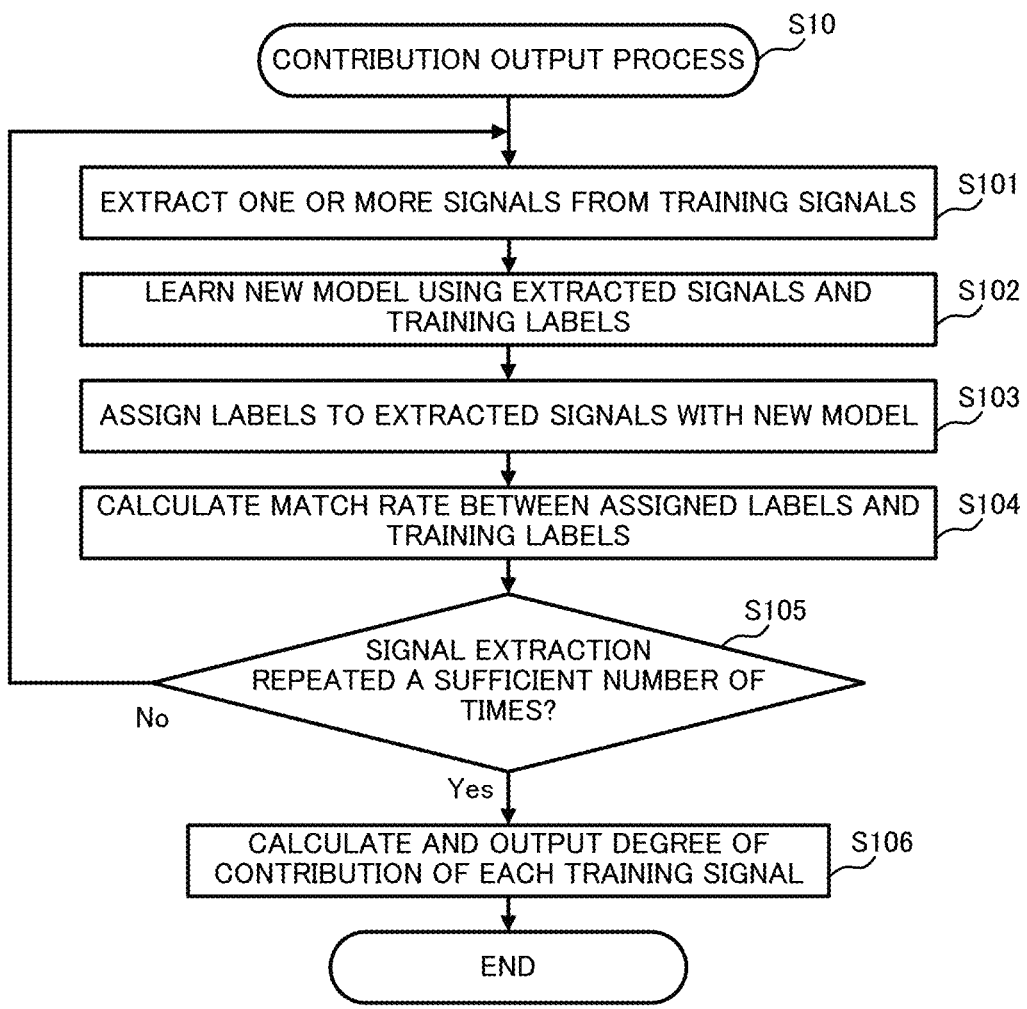
FIG. 19 is a flowchart showing a contribution output process in Embodiment 1.

The learning process performed by the learning device 100 will now be described with reference to FIGS. 15 to 19. FIG. 15 shows a learning process for learning a model with a training signal selected from candidate signals. The learning process is started by the learning device 100 executing a specific program.

In the learning process, the first acquirer 11 acquires candidate signals and training labels (step S1). For example, the first acquirer 11 acquires data shown in FIG. 16.

The learning device 100 then determines whether any external storage data is available (step S2). More specifically, the second acquirer 12 accesses the server 40 and inquires about the availability of any storage data including additional signals to be added to the candidate signals acquired in step S1 and training labels. The second acquirer 12 may inquire about the availability of the storage data upon being requested by the user.

When determining that no external storage data is available (No in step S2), the learning device 100 advances to step S4. When determining that the storage data is available (Yes in step S2), the second acquirer 12 acquires the additional signals and the training labels as storage data (step S3). The storage data acquired in this step may include features calculated by another learning device based on the additional signals. In this manner, as shown in FIG. 17, the additional signals are added to the candidate signals acquired in step S1 to provide signals sufficient to select signals and learn a model.

Referring back to FIG. 15, after step S3, the feature calculator 13 calculates features using the candidate signals (step S4). More specifically, the feature calculator 13 calculates features using the partial signals extracted from the candidate signals for predetermined intervals. The provider 14 then associates the candidate signals with the training labels and provides the associated signals and labels to an external device as storage data (step S5). This allows other learning devices to use the storage data for selecting signals and learning models.

The selector 16 then calculates a degree of relevance between the training labels acquired in step S1 and the features calculated in step S4 (step S6). More specifically, the selector 16 calculates the degree of relevance between the training labels and the features depending on the condition input into the condition input unit 15. For example, when the input condition is abnormality detection, the selector 16 calculates a degree of correlation between the training labels and the features as the degree of relevance. The degree of correlation between the training labels and the features may be, for example, a measure of difference in distributions as observed in FIG. 5 or may be calculated by evaluating the independence of the features for each training label. In the example shown in FIG. 18, the lines indicate the frequency distributions for three different training labels. The distributions indicated by lines L31 and L32 overlap each other, whereas the distribution indicated by line L33 does not overlap the other distributions. The third feature thus has a high degree of relevance to a third training label indicated by line L33. When the input condition is degradation diagnosis, the selector 16 calculates, as the degree of relevance, the degree of the relationship between the training labels and the features varying over time. The degree of relevance is calculated in any manner that yields a high degree of relevance for the feature acquired using a candidate signal useful for assigning labels.

Subsequently, the selector 16 selects, as training signals, the candidate signals for the feature with a high degree of relevance calculated in step S6 (step S7). More specifically, the selector 16 selects, from all the candidate signals, a predetermined number of candidate signals in the order of features with higher degrees of relevance. In other words, the selector 16 selects, as training signals, candidate signals corresponding to the features with higher degrees of relevance to the training labels than other features from multiple candidate signals.

The learner 102 then learns a model using the training signals selected in step S7 and the training labels acquired in step S1 (step S8). The model output unit 104 outputs the model learned in step S8 (step S9).

Subsequently, the contribution output unit 103 performs a contribution output process (step S10). The contribution output process will now be described with reference to FIG. 19.

In the contribution output process, the contribution output unit 103 extracts one or more signals from multiple training signals (step S101). More specifically, the contribution output unit 103 excludes at least one training signal from multiple training signals and extracts the remaining one or more training signals. Any number of training signals may be excluded, and any training signal may be extracted. For example, the contribution output unit 103 may extract, from all combinations of one or more signals extracted from multiple training signals, a combination of signals that are yet to be extracted. For many training signals in an enormous number of combinations, the contribution output unit 103 may randomly extract signals from multiple training signals. In another example, the contribution output unit 103 may extract, from all combinations of signals extracted from multiple training signals, a predetermined number of signals in combinations yet to be extracted. For example, one or two signals are extracted.

The learner 102 then learns a new model using the signals extracted in step S101 and the training labels (step S102). The contribution output unit 103 then assigns labels to the extracted signals with the new model learned in step S102 (step S103). The contribution output unit 103 then calculates the match rate between the labels assigned in step S103 and the training labels (step S104).

Subsequently, the contribution output unit 103 determines whether signal extraction has been repeated a sufficient number of times (step S105). More specifically, the contribution output unit 103 determines whether the processing in steps S101 to S104 has been repeated a predetermined number of times. When determining that signal extraction has not been repeated a sufficient number of times (No in step S105), the contribution output unit 103 repeats the processing in step S101 and subsequent steps.

When determining that signal extraction has been repeated a sufficient number of times (Yes in step S105), the contribution output unit 103 calculates and outputs the degree of contribution of each training signal based on the match rate repeatedly calculated in the step S104 (step S106). After the contribution output process is complete, the learning process ends as shown in FIG. 15.

As described above, the selector 16 selects training signals from multiple candidate signals based on the degree of relevance between the features and the training labels. More specifically, the selector 16 selects, as training signals, candidate signals corresponding to the features with a higher degree of relevance to the training labels than other features. The features with a high degree of relevance to the training labels are more useful in assigning labels to input signals. The candidate signals for such features are appropriate for model learning. This allows selection of training signals appropriate for model generation. This also improves the accuracy of the model used for data analysis and shortens the time for signal analysis.

Additionally, selecting appropriate training signals allows learning of appropriate models, thus enabling automatic and accurate assignment of labels to various signals at a production site or a plant for signal analysis.

The second acquirer 12 acquires storage data, thus allowing use of information from similar sensors installed in the same or a different factory to accurately select useful signals.

The contribution output unit 103 outputs the degree of contribution of each training signal, thus widening the use of the signal analysis using a model. This allows, for example, the user to easily select an analysis approach. This also allows easy estimation of risks involved in potential erroneous determinations in analysis results as well as easy handling of potential errors in analysis results.

Embodiment 2

Embodiment 2 will now be described focusing on the differences from Embodiment 1 described above. The same or corresponding components as in Embodiment 1 are given the same reference signs, and will not be described or will be described briefly. In Embodiment 1, one or more signals are repeatedly extracted from training signals, and the results of such repeated extraction are compared to calculate the degree of contribution of each training signal. In the embodiment described below, the values of training signals are repeatedly changed to calculate the degree of contribution.

Figure 20:
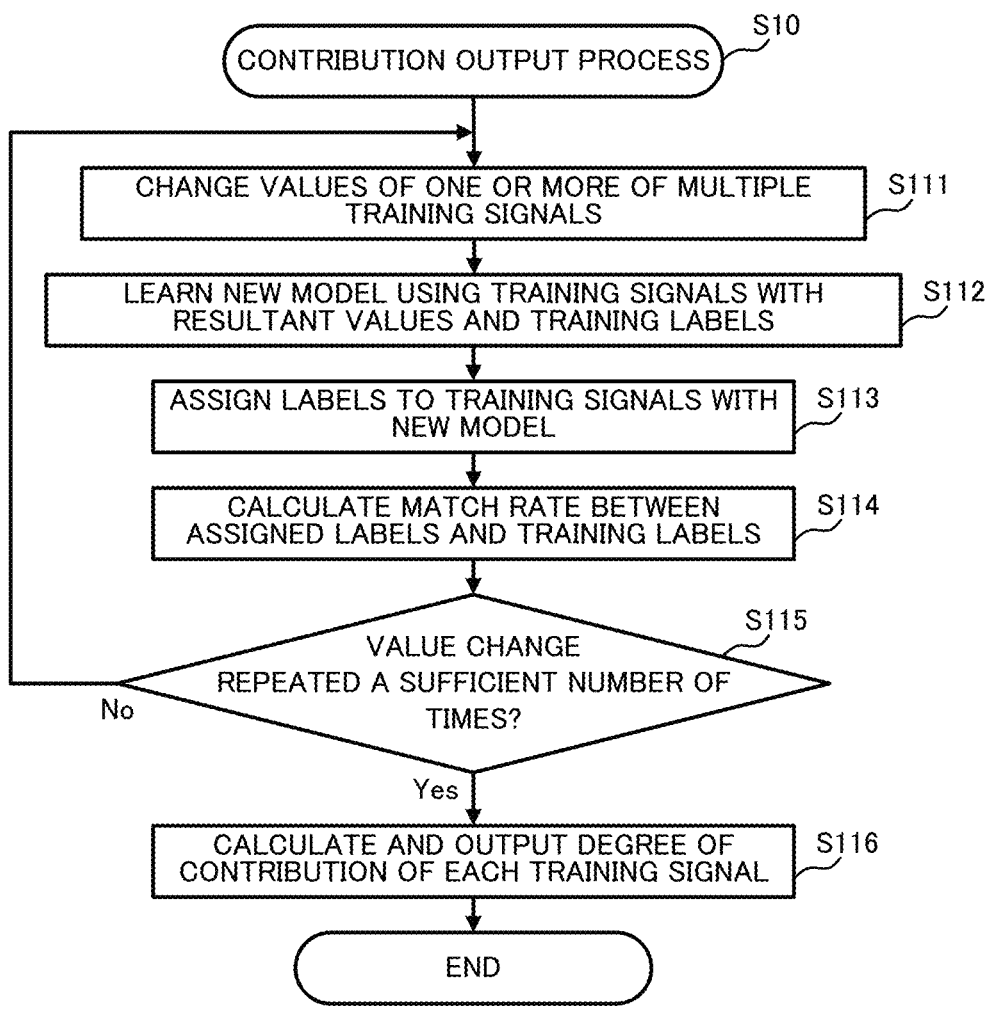
FIG. 20 is a flowchart showing a contribution output process in Embodiment 2.

The contribution output unit 103 performs a contribution output process shown in FIG. 20. In the contribution output process, the contribution output unit 103 changes the values of one or more of multiple training signals (step S111). The values may be changed to, for example, random values, or changed in any other manner.

The learner 102 then learns a new model using the training signals with the resultant values and the training labels (step S112). The contribution output unit 103 assigns labels to the training signals with the new model (step S113). The contribution output unit 103 then calculates the match rate between the labels assigned in step S103 and the training labels (step S114). When the value change is performed for training signals with a low degree of contribution, the match rate between the training labels and the labels assigned by the model learned using the training signals remains relatively high. When the value change is performed for training signals with a high degree of contribution, the match rate may decrease greatly. Thus, the values of one or more of multiple training signals are changed repeatedly to acquire the degree of contribution.

The contribution output unit 103 then determines whether the value change has been repeated a sufficient number of times (step S115). When determining that the value change has not been repeated a sufficient number of times (No in step S115), the contribution output unit 103 repeats the processing in step S111 and subsequent steps. When determining that the value change has been repeated a sufficient number of times (Yes in step S115), the contribution output unit 103 calculates and outputs the degree of contribution of each training signal based on the match rate repeatedly calculated in the step S114 (step S116). The contribution output process then ends.

As described above, the contribution output unit 103 calculates the degree of contribution by changing the values of training signals. The process in this embodiment also produces the same effect as the process in Embodiment 1.

Although the embodiments of the present disclosure have been described above, the present disclosure is not limited to the above embodiments.

Figure 21:
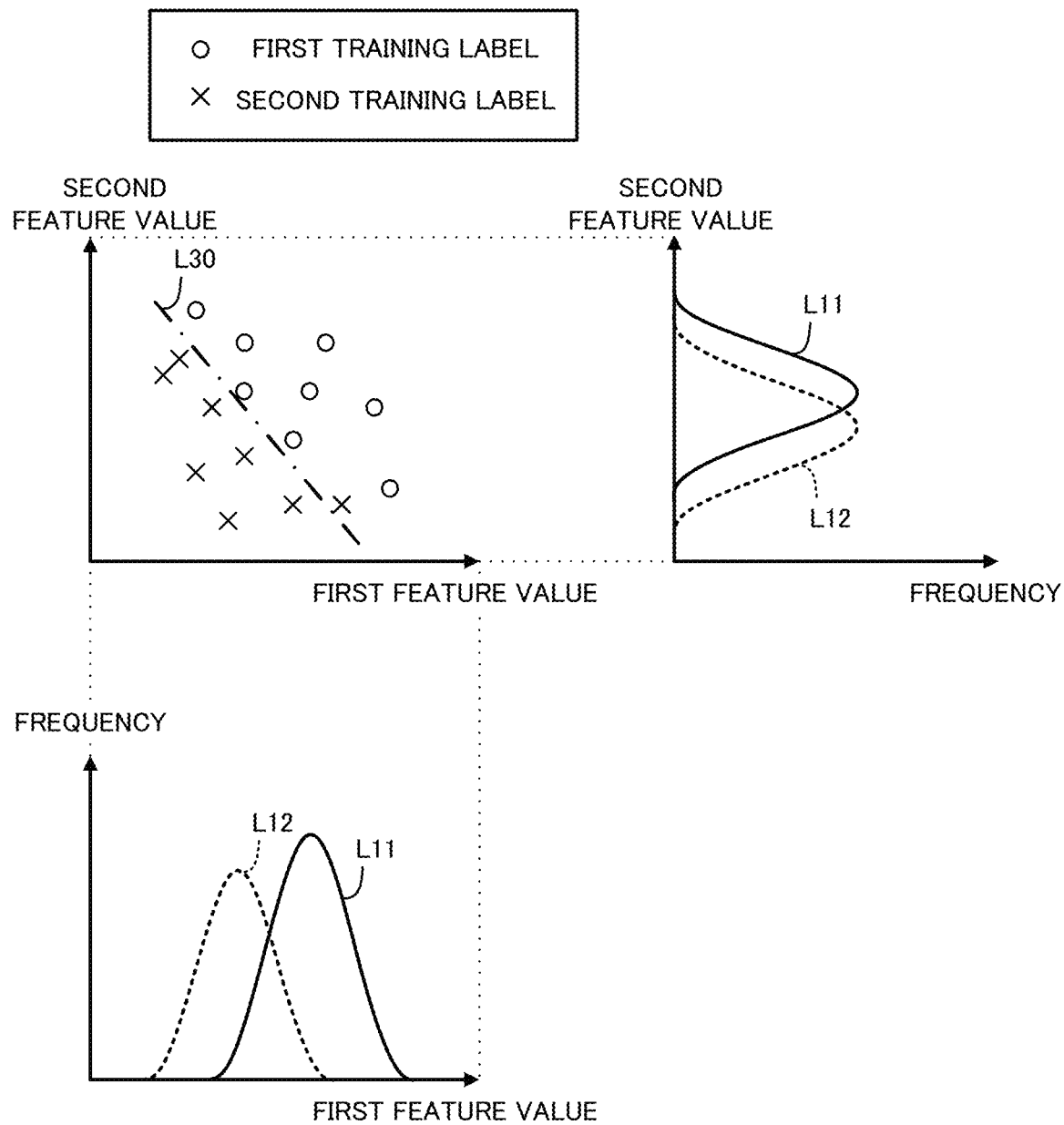
FIG. 21 is a diagram describing multiple features relevant to labels.

In Embodiments 1 and 2, one candidate signal corresponds to one feature for ease of understanding. Any other number of features may correspond to any other number of candidate signals. In the example shown in FIG. 21, a first feature has frequency distributions with line L11 and line L12 overlapping each other. This may indicate that the first feature does not contribute to label determination. A second feature has frequency distributions with line L11 and line L12 overlapping each other. This may indicate that the second feature does not contribute to label determination. However, the distributions of the first and second features observed multi-dimensionally indicate that the labels can be accurately determined using line L30 set as a boundary. Thus, the first and second features in combination have a high degree of relevance to the first and second training labels.

The processes in Embodiments 1 and 2 may be combined. More specifically, one or more signals may be extracted from training signals, and the values of the extracted signals may be changed and used for new model learning. The labels assigned by the new model may be compared with the training labels to calculate the degrees of contribution based on the match rate between the labels.

The storage data provided by the provider 14 may additionally include weight coefficients for the features associated with the candidate signals. For example, a larger weight coefficient may be associated with features for candidate signals acquired from more reliable devices, and a smaller weight coefficient may be associated with features for candidate signals acquired from less reliable devices. The features can be used in accordance with device reliability. When a device expected to be more reliable shows a certain relevance between a feature and labels, a target device similar to the device may use the value of the relevance. For example, storage data from a reliable similar device may include a candidate signal with a feature with a label selected from five labels, or specifically, failure, dangerous, caution needed, under observation, or normal. The storage data acquired by the second acquirer 12 may be used in a target device by appropriately adjusting the labels, or by changing the label dangerous to caution-needed and the label caution-needed to under observation, and combining the labels under observation and normal into normal.

Although the model for signal analysis learned in each of the above embodiments is used for a production system, the learning device 100 may learn a model for signal analysis to be used in a processing system, an inspection system, or any other system. Any model for analyzing signals at facilities, typically factories and plants, may be learned.

Although the learning device 100 includes the signal selection device 10 in the above examples, these devices may be separate from each other.

The functions of the learning device 100 are implementable by dedicated hardware or a common computer system.

For example, the program P1 executable by the processor 51 may be stored in a non-transitory computer-readable recording medium for distribution. The program P1 is installed in a computer to provide a device that performs the above processing. Examples of such a non-transitory recording medium include a flexible disk, a compact disc read-only memory (CD-ROM), a digital versatile disc (DVD), and a magneto-optical (MO) disk.

The program P1 may be stored in a disk unit included in a server on a communication network, typically the Internet, and may be, for example, superimposed on a carrier wave to be downloaded to a computer.

The processing described above may also be performed by the program P1 being activated and executed while being transferred through a communication network.

The processing described above may also be performed by the program P1 being entirely or partially executed on a server with a computer transmitting and receiving information about the processing through a communication network.

In the system with the above functions implementable partly by the operating system (OS) or through cooperation between the OS and applications, portions executable by applications other than the OS may be stored in a non-transitory recording medium that may be distributed or may be downloaded to a computer.

Means for implementing the functions of the learning device 100 is not limited to software. The functions may be partly or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The technique described in one or more embodiments of the present disclosure is suitable for learning models that label input signals.

REFERENCE SIGNS LIST 100, 100a, 100b Learning device
10 Signal selection device
11 First acquirer
12 Second acquirer
13 Feature calculator
14 Provider
15 Condition input unit
16 Selector
20 Model
40 Server
41 Storage data
42 Storage data
51 Processor
52 Main memory
53 Auxiliary memory
54 Input unit
55 Output unit
56 Communicator
57 Internal bus
101 Approach storage
102 Learner
103 Contribution output unit
104 Model output unit
L11, L12, L30, L31, L32, L33 Line
P1 Program

The invention claimed is:

1. A learning device comprising:
circuitry configured to
select, from a plurality of candidate signals, a plurality of training signals for learning a model used for data analysis,
acquire the plurality of candidate signals and training labels associated with the plurality of candidate signals, the training labels being status values corresponding to results of the data analysis performed using the model,
calculate one or more features using the plurality of candidate signals,
select each said training signal from the plurality of candidate signals based on a degree of relevance between the one or more features and the training labels,
learn the model based on each said training signal selected,
output a degree of contribution indicating a degree of contribution of the plurality of the training signals selected to label assignment performed using the model,
repeat changing a value of each of the plurality of training signals to generate a new model, and
calculate and output the degree of contribution based on a comparison between the training labels and labels assigned to the plurality of training signals in accordance with the new model generated through the repeated changing.

2. The learning device according to claim 1, wherein the circuitry is configured to calculate the one or more features using a partial signal extracted from each of the plurality of candidate signals for a predetermined time interval.

3. The learning device according to claim 1, wherein the circuitry is configured to select, as each said training signal, one of the candidate signals corresponding to a feature, of the one or more features, with a higher degree of relevance to the training label than other features from the plurality of candidate signals.

4. The learning device according to claim 1, wherein the circuitry is configured to provide, to another device, the plurality of candidate signals and the one or more features in a manner associated with each other.

5. The learning device according to claim 1, wherein the circuitry is configured to acquire a plurality of additional signals to be added as the plurality of candidate signals and additional one or more features associated with the plurality of additional signals.

6. A learning method for selecting, from a plurality of candidate signals, a plurality of training signals for learning a model used for data analysis and learning the model based on the training signals, the method comprising:

calculating, by circuitry, a feature using the plurality of candidate signals;

selecting, by the circuitry, each said training signal from the plurality of candidate signals based on a degree of relevance between the feature and training labels being status values corresponding to results of the data analysis performed using the model;

repeating, by the circuitry, changing a value of each of the plurality of training signals to generate a new model; and calculating and outputting, by the circuitry, a degree of contribution based on a comparison between the training labels and labels assigned to the plurality of training signals in accordance with the new model generated through the repeated changing, the degree of contribution indicating a degree of contribution of the plurality of training signals selected in the selecting to label assignment performed using the model.

7. The method according to claim 6, wherein the feature is calculated using a partial signal extracted from each of the plurality of candidate signals for a predetermined time interval.

8. The method according to claim 6, wherein one of the candidate signals is selected, as each said training signal, that corresponds to a feature with a higher degree of relevance to the training label than other features from the plurality of candidate signals.

9. The method according to claim 6, further comprising providing, to another device, the plurality of candidate signals and the feature in a manner associated with each other.

10. The method according to claim 6, further comprising acquiring a plurality of additional signals to be added as the plurality of candidate signals and one or more features associated with the plurality of additional signals.

11. A non-transitory computer-readable recording medium storing a program, the program causing a computer to select, from a plurality of candidate signals, a plurality of training signals for learning a model used for data analysis and learning the model based on the training signals, the program causing the computer to perform operations comprising:

calculating a feature using the plurality of candidate signals;

selecting each said training signal from the plurality of candidate signals based on a degree of relevance between the feature and training labels being status values corresponding to results of the data analysis performed using the model;

repeating changing a value of each of the plurality of training signals to generate a new model; and calculating and outputting a degree of contribution based on a comparison between the training labels and labels assigned to the plurality of training signals in accordance with the new model generated through the repeated changing, the degree of contribution indicating a degree of contribution of the selected plurality of training signals to label assignment performed using the model.

12. The non-transitory computer-readable recording medium according to claim 11, wherein the feature is calculated using a partial signal extracted from each of the plurality of candidate signals for a predetermined time interval.

13. The non-transitory computer-readable recording medium according to claim 11, wherein one of the candidate signals is selected, as each said training signal, that corresponds to a feature with a higher degree of relevance to the training label than other features from the plurality of candidate signals.

14. The non-transitory computer-readable recording medium according to claim 11, wherein the operations further comprise providing, to another device, the plurality of candidate signals and the one or more features in a manner associated with each other.

15. The non-transitory computer-readable recording medium according to claim 11, wherein the operations further comprise acquiring a plurality of additional signals to be added as the plurality of candidate signals and one or more features associated with the plurality of additional signals.

* * * * *